United States Patent
Lazzerini

(10) Patent No.: US 8,584,948 B2
(45) Date of Patent: Nov. 19, 2013

(54) SECURITY ELEMENT COMPRISING MAGNETIC AREAS OF DIFFERENT COERCIVITIES, A METHOD FOR ITS PRODUCTION AND A METHOD FOR READING INFORMATION ENCODED IN THE ELEMENT

(75) Inventor: Maurizio Lazzerini, Cerro al Lambro (IT)

(73) Assignee: Fedrigoni S.p.A., Verona (IT)

( * ) Notice: Subject to any disclaimer, the term of this patent is extended or adjusted under 35 U.S.C. 154(b) by 0 days.

(21) Appl. No.: 13/259,361

(22) PCT Filed: Apr. 1, 2009

(86) PCT No.: PCT/IT2009/000133
§ 371 (c)(1),
(2), (4) Date: Oct. 5, 2011

(87) PCT Pub. No.: WO2010/113192
PCT Pub. Date: Oct. 7, 2010

(65) Prior Publication Data
US 2012/0018513 A1 Jan. 26, 2012

(51) Int. Cl.
*G06K 7/08* (2006.01)
*G06K 19/06* (2006.01)

(52) U.S. Cl.
USPC ............ 235/449; 235/379; 235/440; 235/493

(58) Field of Classification Search
USPC ......... 235/375, 379, 449, 487, 493, 440, 450, 235/380
See application file for complete search history.

(56) References Cited

U.S. PATENT DOCUMENTS

| | | | | |
|---|---|---|---|---|
| 3,862,716 A * | 1/1975 | Black et al. | ................... | 235/381 |
| 4,222,517 A * | 9/1980 | Richardson | ................... | 235/493 |
| 5,196,681 A * | 3/1993 | Mantegazza | ................... | 235/449 |
| 5,545,885 A * | 8/1996 | Jagielinski | ................... | 235/449 |
| 6,146,773 A * | 11/2000 | Kaule | ........................... | 428/611 |
| 6,254,002 B1 * | 7/2001 | Litman | ......................... | 235/450 |

(Continued)

FOREIGN PATENT DOCUMENTS

DE 10 2004 049999 4/2006
EP 0 428 779 11/1989
(Continued)

OTHER PUBLICATIONS

English Translation of WO 2004/091930; http://patentscope.wipo.int/search/en/detail.jsf Sep. 10, 2012.*
International Search Report dated Dec. 22, 2009.

*Primary Examiner* — Tuyen K Vo
(74) *Attorney, Agent, or Firm* — Scully, Scott, Murphy & Presser, P.C.

(57) ABSTRACT

A security element, particularly for banknotes, security cards and the like, comprising a first substrate which is at least partially opaque when viewed in transmitted light, and a plurality of magnetic areas being arranged on the substrate, wherein each of the magnetic areas is formed by a first magnetic material, a second magnetic material or an arrangement of the first and the second magnetic materials being at least partially superimposed, the first magnetic material and the second magnetic material exhibiting different coercivity values which are detectable by a sensor, wherein the first and second magnetic materials are magnetically saturated such that one of the first and second magnetic materials is not affected by the other.

25 Claims, 2 Drawing Sheets

(56) References Cited

U.S. PATENT DOCUMENTS

| | | | |
|---|---|---|---|
| 6,491,221 B1 * | 12/2002 | Arnold et al. | 235/449 |
| 2006/0125176 A1 | 6/2006 | Kato | |
| 2008/0311317 A1 * | 12/2008 | Isherwood et al. | 428/30 |
| 2009/0008922 A1 | 1/2009 | Schutzmann et al. | |
| 2009/0029123 A1 * | 1/2009 | Isherwood et al. | 428/204 |
| 2009/0152365 A1 * | 6/2009 | Li et al. | 235/493 |
| 2009/0159709 A1 * | 6/2009 | Mullen | 235/493 |

FOREIGN PATENT DOCUMENTS

| | | |
|---|---|---|
| EP | 1 672 594 | 6/2006 |
| GB | 2 318 089 | 4/1998 |
| WO | WO 2004/091930 | 10/2004 |
| WO | WO 2010/113192 | 10/2010 |

* cited by examiner

SECURITY ELEMENT COMPRISING MAGNETIC AREAS OF DIFFERENT COERCIVITIES, A METHOD FOR ITS PRODUCTION AND A METHOD FOR READING INFORMATION ENCODED IN THE ELEMENT

TECHNICAL FIELD

The present invention relates to a security element particularly for banknotes, security cards and the like, which has a high anti-counterfeiting capability.

BACKGROUND ART

As is known, as the technology evolves and devices for duplicating graphical elements which are printed or positioned on banknote paper become widespread, the need to have security elements which can be introduced at least partially in the banknote paper has been increasing and still is. One of the elements that is constantly being developed and is researched is the security thread that is generally inserted at least partially in banknote paper.

Over the years, the security thread has undergone a constant but significant evolution, so much that it is still one of the least counterfeited elements, since its counterfeiting is difficult even for expert counterfeiters.

Among security threads, it is possible to identify for example metallic threads with negative text, i.e., threads provided by a plastic substrate onto which at least one layer of metal is deposited, characters, lettering and the like being formed in such layer of metal by total removal of the metal at the regions of the characters and/or lettering.

EP 319 157 discloses the method outlined above.

A thread is also known for example in which, in order to increase the security characteristics, at least one full-surface layer is added which therefore covers both the regions without metal and the metallic regions with ink having fluorescent properties.

There are other types of threads in which discontinuities of the metal are inserted between blocks of letters so that conductivity can be detected in certain and known lengths.

However, the marketing of "transfer" metallized stripes has caused all these types of threads to undergo significant counterfeiting, which has led to the need to provide a partially demetallized thread, which thus leaves in the characters a small amount of metal, which can be detected by suitable laboratory equipment.

Therefore, in this last type of threads, the characters are demetallized only partially. Patent applications WO2004/014665 and WO2004/098900 relate to so-called partially demetallized threads of the type described above.

There are also types of threads which can be detected also by means of magnetic sensors. EP 516 790 discloses a thread in which detectable magnetic regions are inserted between the letters formed by performing total demetallization so that the thread can thus be detected both as conductive (due to the presence of metal deposited in continuous form) and by means of magnetic sensors (due to the magnetic elements arranged above or below the layer of metal but never inside the letters).

Therefore, EP 516 790 discloses a security device in which the characters or letters are totally demetallized.

Generally, coded magnetic threads are currently produced by depositing magnetic areas on a fully metallized polyester substrate; these areas are composed with a single type of magnetic ink and are separated by spaces in which regions without metallic material, meant for generating texts, are generated. It is evident that once the presence of magnetic areas has been discovered, their coercivity and residual magnetism can be identified easily and consequently so can the magnetic material to be used to create a counterfeit or forgery; a code thus provided generates the same signals, and therefore the same code, both when it is detected longitudinally (along the axis of the thread) and when it is detected transversely (reading at right angles to the thread).

Security threads with magnetic regions provided with a single type of magnetic ink also have undergone counterfeiting, again with the transfer technique. It is in fact possible to provide a ribbon or stripe which has negative characters by using metallic transfers onto which magnetic elements are transferred at a later time, between the blocks of letters, both in continuous form and in discontinuous form in order to create magnetic codes. To provide industrially a thread of the type cited above it is sufficient to have a rotary press with a plurality of printing sections as described above also in EP 516 790, printing onto a transparent material (generally polyester) markings with removable inks, performing full-surface vacuum metalization so as to cover the removable inks, removing the inks and consequently also the metal that covers them, thus leaving markings which are identical to the ones printed with removable inks, and subsequently reprinting with magnetic inks continuous or discontinuous areas in the regions which have not been demetallized and are therefore adjacent to the demetallized regions.

In this manner, the presence of magnetic elements is not visible with normal viewing instruments (naked eye, optical magnifying devices, et cetera), since they are always covered by metal. The magnetic elements are visible only by means of suitable devices dedicated to the detection of magnetism, such as for example magnetic scanners or lenses with liquid magnetic ink inserted in vacuum.

DISCLOSURE OF THE INVENTION

The aim of the present invention is to provide a security element particularly for banknotes, security cards and the like, having magnetic elements in which the magnetic difference of the regions cannot be detected by normal instruments for detecting current magnetic codes provided on security threads.

Within this aim, an object of the present invention is to provide a security element, particularly for banknotes, security cards and the like, in which said magnetic elements can be detected exclusively by means of dedicated sensors.

Another object of the present invention is to provide a security element in which the magnetic elements have such differences as to generate different codes which can be detected even with devices whose feed rate is from one banknote per second up to at least 50 banknotes per second.

Another object of the present invention is to provide a security element in which its counterfeiting is made even more difficult with respect to known types of security elements since only someone who knows the basic principle and the location of the areas can detect their content.

Still another object of the present invention is to provide a security element which is highly reliable, relatively simple to provide and at competitive costs.

This aim and these and other objects, which will become better apparent hereinafter, are achieved by a security element, particularly for banknotes, security cards and the like, comprising a first substrate which is at least partially opaque when viewed in transmitted light, and a plurality of magnetic areas being arranged on said substrate, wherein each of said magnetic areas is formed by a first magnetic material, a second magnetic material or an arrangement of the first and the second magnetic materials being at least partially superimposed, the first magnetic material and the second magnetic material exhibiting different coercivity values which are detectable by a sensor, wherein the first and second magnetic materials are magnetically saturated such that one of the first and second magnetic materials is not affected by the other.

BRIEF DESCRIPTION OF THE DRAWINGS

Further characteristics and advantages of the present invention will become better apparent from the detailed description of preferred but not exclusive embodiments of the security element according to the present invention, illustrated by way of non-limiting example in the accompanying drawings, wherein.

WAYS OF CARRYING OUT THE INVENTION

Figure 1:
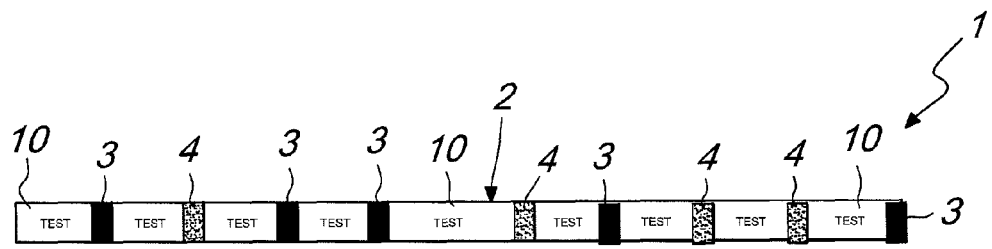
FIG. 1 is a plan view of a security element according to the present invention, with the optional second supporting layer removed, according to a first embodiment of the invention.

With reference to the figures, the security element according to the present invention, generally designated by the reference numeral 1, comprises a first substrate or first supporting layer 2 which is at least partially opaque when viewed in transmitted light and on which magnetic areas 3, 4 are deposited. The substrate 2 is conveniently made of plastics, such as polyester, and the opacity is provided by the presence of deposits of metal or inks with colors and/or pigments, or color-shifting materials or materials obtained from mixtures of such materials.

One of the peculiarities of the invention consists in that the magnetic areas 3, 4 comprise at least two types of magnetic areas, respectively formed by a first and a second magnetic materials, which have different coercivity values and whose residual magnetism is identical or different; the difference in coercivity and the identical or different residual magnetism are aimed at generating at least three different codes.

In particular, the magnetic areas are formed by means of magnetic inks whose coercivity is different (for example 200 oe for the lowest and 3000 oe for the highest) and whose residual magnetism can be identical or different depending on the type of coding, equally when they are arranged sequentially, adjacently or superimposed.

Suppose that a sequence of nine magnetic areas 3, 4 spaced by 4 (and more than 4) mm of gap is printed onto a thread which is 2 mm wide, with identical residual magnetism but in which the first, third, fourth, sixth and ninth areas have a coercivity of 4500 oe, while the second, fifth, seventh and eighth areas have a coercivity of 300 oe.

By orienting all the areas 3, 4 with a magnet with high coercive power (15000 G) and detecting them with a first reading head of a reading sensor, one obtains six areas in sequence; a second magnet, with reduced coercive power (2500 G) but sufficient to turn through 90° the magnetism of the areas 4 with low coercive power, allows a second reading head to detect only the remaining magnetic areas, which are the ones with high coercive power.

Figure 2:
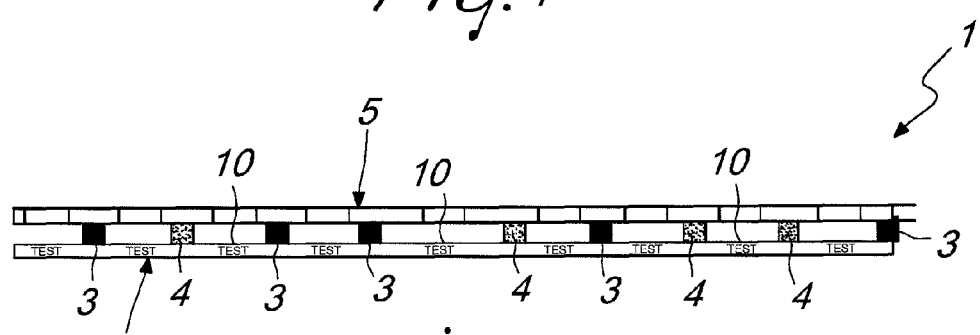
FIG. 2 is a sectional view of the security element of FIG. 1, with the second supporting layer present.
Figure 3A:
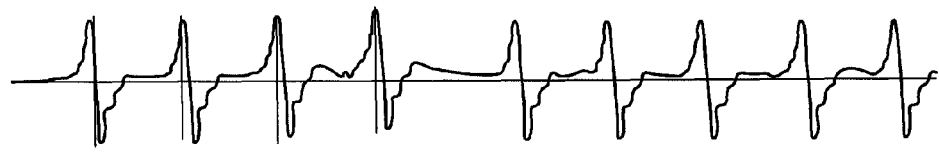
FIGS. 3a, 3b and 3c are views of respective signals which can be obtained, and therefore of codes which can be obtained, by reading the security element according to FIGS. 1 and 2.
Figure 3B:
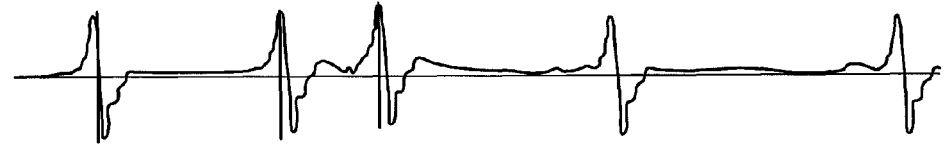
Figure 3C:
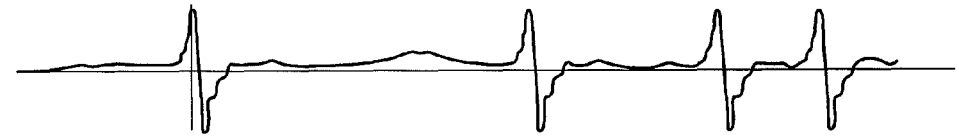
Figure 4:
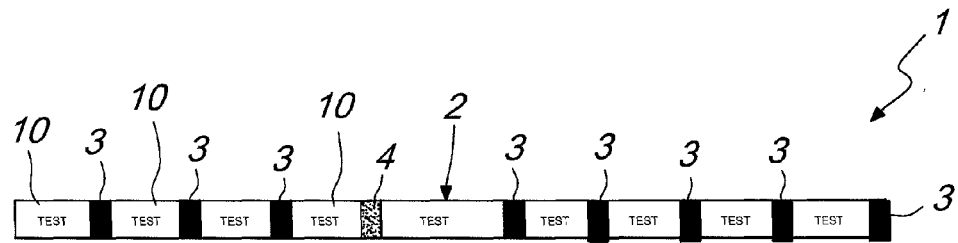
FIG. 4 is a plan view of a security element according to the present invention, with the optional second supporting layer removed, in accordance with a second embodiment of the invention.

FIGS. 3a-3c plot respectively the signals which can be detected by a reading sensor, for a security element 1 according to the first embodiment of FIGS. 1 and 2, in which FIG. 3a plots the signals that can be detected from all the magnetic areas 3, 4, FIG. 3b plots the signals that can be detected from the magnetic areas with high coercivity, and FIG. 3c plots the signals which can be detected from the magnetic areas with low coercivity.

Substantially, a security element, such as a security thread, has been provided which contains a first code generated by all the magnetic areas 3, 4 that are present (read by the first reading head), a second code generated only by the areas 3 with high coercive power (read by the second reading head), and a third code generated only by the areas 4 with low coercive power (the result of all the areas 3, 4 minus those with high coercive power 3). This is achieved by using for example the same value of residual magnetism both for the areas 4 with low coercive power and for the areas 3 with high coercive power.

Figure 5:
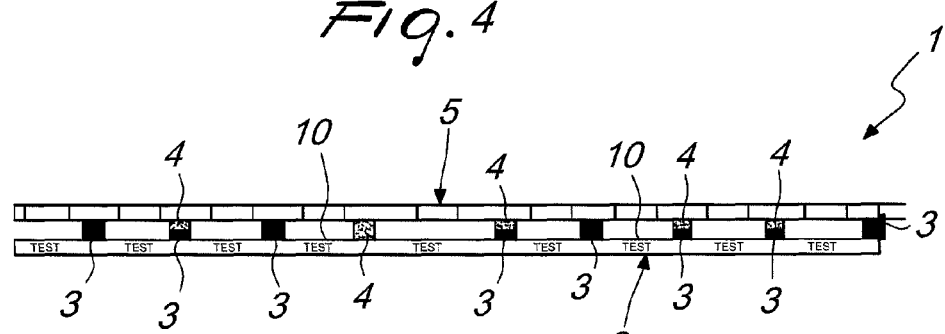
FIG. 5 is a sectional view of the security element of FIG. 4, with the second supporting layer present.

In order to further increase the degree of non-counterfeitability of the security element according to the invention, it is possible to provide areas 3 with high coercive power which are arranged so as to be at least partially superimposed on areas 4 with low coercive power (see FIG. 5), in which the sum of the residual magnetisms is equal to the residual magnetism of the adjacent areas, both if they have high coercive power and if they have low coercive power.

The magnetic areas are saturated in a magnetized condition such that the mutual magnetization of the first and second magnetic materials having different coercive values is inhibited.

Thus, a magnetic isolation between the different magnetic materials is provided.

In other words, the saturation of the first and second magnetic materials has the effect that one of the first and second magnetic materials is not affected by the other.

A third magnetic material may be provided in at least part of the magnetic areas being at least partially superimposed on the first magnetic material and/or the second magnetic material. Such third magnetic material being provided by a mix of the first and second magnetic materials.

Both inks with high coercive power and inks with low coercive power can be provided by means of mixtures of oxides or with a single type of oxide, all this being aimed at achieving the different significant coercivity.

This overlap can occur for example by overprinting or, better still, by coupling in register two supporting or substrate layers 2, 5 in which respectively the first one contains the areas 3 with high coercive power and with a residual magnetism for example equal to 100 nW/m, with other areas 3 with high coercive power with a residual magnetism for example equal to 50 nW/m and the second supporting layer 5 contains areas 4 with low coercive power with a residual magnetism equal for example to 100 nW/m and 50 nW/m.

If the two layers 2, 5 are coupled in register, overlapping the 50 nW/m areas, one obtains a sequence of areas whose signals, oriented with a magnet with high coercive power and read by the first reading head, are a very similar sequence, the variation of which is caused only by the length of the areas and of the corresponding gap.

By then turning through 90° the magnetic flux of the areas with low coercive power 4, using a weaker magnet, therefore for example a 2500-G magnet, one obtains a number of signals in sequence which is equal to those of the first head, but with an electrical signal which is 50% lower in the areas provided by superimposing inks or by coupling.

By arranging the analog signal recognition threshold at different levels (as shown for example in broken lines in FIGS. 6b, 6c), it is possible to obtain additional codes, since bits which are originally of high value, once reduced, can be detected further or ignored indeed by arranging the noise threshold differently.

By further using, for example, a base module of 4 mm on which the bars and/or corresponding gaps are to be deposited, it is much easier, in case of the presence of all the bits for the first code and of the partial presence of the second and third code, to recognize the codes, since they depend on the base 4-mm module.

Another way to make areas whose characteristic is that they are provided with inks with different coercivity and whose initially identical residual magnetism is then different when such areas are further magnetized with a magnet whose flux is rotated through 90°, is to provide them by means of a single ink which contains a mixture of oxides (such as 50% of 4000 oe+50% of 300 oe); in this manner, depending on the percentage of mixture used, it is possible to have a number of possibilities to provide different codes.

Another example consists in using, for some areas, an ink with only 4000-oe pigment and, for the remaining areas, an ink with a mixture composed of 33% 4000-oe pigment and 66% pigment with a coercivity of 300 oe. In this manner, one obtains areas composed with the mixture which are preset to generate magnetic signals as a function of the strength of the magnet that is used, of the orientation of the flux and of the method of use.

Systems of this type allow a number of customizations which greatly increase the degree of non-counterfeitability in addition to allowing verification of the banknote that incorporates the security thread both at low speed and at high speed.

Suppose that a security thread is provided which is 2 mm wide, has a first supporting layer 2 made of plastics such as polyester, onto which a full surface of aluminum 10 is deposited by vacuum metalization in which, by means of a demetallization process, text and/or graphic markings are removed completely or partially, according to a preset graphic layout, considering the thickness of the aluminum.

Therefore, magnetic areas 3, 4, for example 2 mm long, spaced by spaces 10 without magnetic material for a length of for example 4 mm, are thus deposited between one text and the other. The magnetic areas 3 are provided by means of inks with high coercive power alternated with magnetic areas 4 with low coercive power; the residual magnetism of these areas is all identical with a tolerance given by the different production processes.

This first supporting layer 2 is then coupled to an additional or second supporting layer 5 of polyester which is always metallized and demetallized, at least partially, in regions in order to leave free the areas where the text has been positioned so that they can be read in transmitted light.

In the regions of the second supporting layer 5 that correspond to the regions where the magnetic areas 3, 4 have already been printed on the first supporting layer 2, new magnetic areas 3 are printed with a different surface: one difference might be for example a 66% coverage of the area, arranging the magnetic material on the edges of the thread.

Suppose that the width of the thread, which has been assumed to be for example 2 mm, is divided into three parts: one has a first area measuring 0.66 mm made of magnetic material, a space of 0.66 mm and a second area of 0.66 mm of magnetic material. By doing so, the codes that are present on the thread, like all the ones described earlier, can be detected with suitable sensors which are described hereinafter.

This last type of thread, therefore, has an additional characteristic, which consists in highlighting the presence of two additional areas only when the document is read transversely to the thread.

It is also evident that the second areas 4, printed on the second supporting layer made of polyester 5, can also be overmolded directly onto the first areas 3 which are already present on the first supporting layer 2 made of polyester.

It is also evident that the magnetic areas 3, 4 provided with different coercivities may have the same and/or a different residual magnetism determined by the different amount of magnetic material that is present for an equal area and thickness, or by the difference in thickness of the deposition for an equal area, or by oxides which have the same coercivity but different residual magnetism (oxides of different physical origin), or between mixtures of all of the above.

Figure 6A:
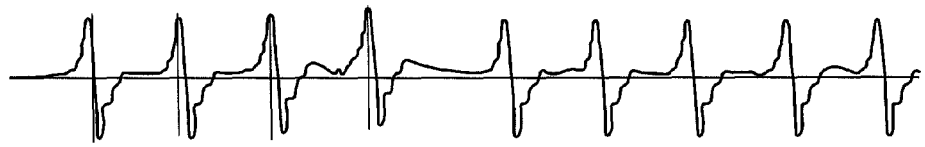
FIGS. 6a, 6b and 6c are views of respective signals which can be obtained, and therefore of codes which can be obtained, by reading the security element according to FIGS. 4 and 5.
Figure 6B:
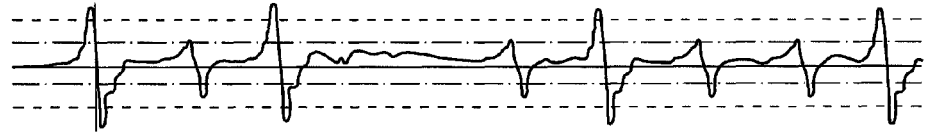
Figure 6C:
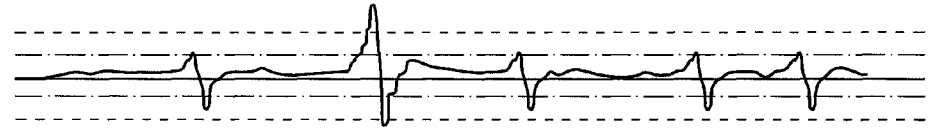

FIGS. 6a, 6b, 6c plot, in a manner similar to FIGS. 3a, 3b and 3c, the signals (codes) which can be detected by the security element provided according to the second embodiment of the invention.

All the previously described threads provide for non-orientation of the magnetic direction of the magnetic ink during the transition from wet ink to dry ink which is characteristic of printing.

Further customizations can be performed for example by orienting the iron oxide which is used for the areas 3 and therefore has a high coercive power during printing, when it is still wet, then overmolding or coupling in register the magnetic areas 4 with low coercive power. In this case, the magnetic areas 3 always have a north-south orientation, while the areas 4 can have a north-south or south-north orientation (180° rotation of magnetism) or are canceled out (for reading which is parallel to the thread), rotating the magnetism of the areas 4 only through 90°.

In order to detect the codes thus provided, it is possible for example to use a reading method of the type disclosed in EP 0428779.

Such patent in fact discloses a method which is based on identifying areas separated by spaces, whose magnetic characteristics are of different coercivity, such as to generate two sequences of signals generated by a first orientation magnet, by a first reading head, by a second orientation magnet for rotating the magnetism and by a subsequent second reading head with an additional reorientation magnet. This reading method therefore entails a plurality of elements arranged in succession.

In the case of the present application, it has been advantageously found that the magnets and the reading heads must be arranged at an angle ranging from 40 to 50° with respect to the longitudinal and/or transverse extension of the security element.

Preferably, such angle must be 45°.

The security element thus provided, detected by the sensors as described and therefore the three codes that exist in a single banknote, can be used for example by different devices intended for different operators, such as ordinary shopkeepers with the first code, commercial banks with the first and second codes, and central banks with all three codes.

To summarize, the three codes of the security element are determined by all the magnetic areas that are present, by the magnetic areas formed by the first magnetic material, and by the magnetic areas formed by the second magnetic material, respectively, wherein the coercivity value of the first magnetic material is higher that that of the second magnetic material.

It is noted that the security element according to the present invention can be for example a security thread or a security ribbon or stripe.

Moreover, the security element according to the present invention can comprise, on at least one of its sides, holographic and/or color-shifting and/or mono- or multifluorescent images.

The security element according to the present invention can be manufactured by means of the following steps.

First of all, the first magnetic material (magnetic areas 3 with low coercivity values) is printed on the first substrate 2. The magnetic areas 3 are then saturated and the signal deriving from such areas is analyzed.

Subsequently, the second magnetic material (magnetic areas 4 with high coercivity values) is then printed both on areas where the first magnetic material is not present and on areas where the first magnetic material is present. In the latter case the second magnetic material is printed with at least partial overlapping with respect to the first magnetic material.

Then, both the first and second magnetic materials are saturated and the signals resulting from the first and second materials are analyzed as far as their peak to peak amplitude is concerned. Those signals could be all the same or different according to the residual magnetism of each printed magnetic areas.

Finally, the second substrate 5 is arranged over the first substrate 2 with the magnetic areas 3 and 4.

In practice it has been found that the security element according to the present invention fully achieves the intended aim and objects.

The security element thus conceived is susceptible of numerous modifications and variations, all of which are within the scope of the appended claims.

All the details may further be replaced with other technically equivalent elements.

In practice, the materials used, as well as the contingent shapes and dimensions, may be any according to requirements and to the state of the art.

The invention claimed is:

1. A security element, particularly for banknotes, security cards, comprising a first substrate which is at least partially opaque when viewed in transmitted light, and a plurality of magnetic areas being arranged on said substrate, wherein each of said magnetic areas is formed by a first magnetic material, a second magnetic material or an arrangement of the first and the second magnetic materials being at least partially superimposed, the first magnetic material and the second magnetic material exhibiting different coercivity values which are detectable by a sensor, wherein the first and second magnetic materials are magnetically saturated such that one of the first and second magnetic materials is not affected by the other, wherein said different coercivity values are adapted to generate at least three mutually different codes, wherein said three codes are determinable by all the magnetic areas that are present, provided by means of inks exhibiting a high coercivity value and by means of inks exhibiting a low coercivity value, by the magnetic areas provided with inks exhibiting a high coercivity value which have mutually identical or different residual magnetism, and by magnetic areas provided by means of inks exhibiting a low coercivity value and the residual magnetism of which is identical and/or different, wherein said magnetic areas are provided by coupling the first substrate with a second substrate, the first substrate containing the first magnetic material and the second substrate containing the second magnetic material, such that magnetic areas are formed by the first magnetic material, the second magnetic material and the arrangement of the first and second magnetic material being superimposed.

2. The security element according to claim 1, wherein said magnetic areas exhibit different coercivity values and a residual magnetism which depends on the different thickness of said areas.

3. The security element according to claim 1, wherein said magnetic areas exhibit different coercivity values and identical residual magnetism, said areas being adapted to generate different analog signals when subjected to a first reading by orienting said areas longitudinally and to a second reading, in which the magnetization/flux is rotated through 90°.

4. The security element according to claim 1, wherein said magnetic areas are arranged sequentially on said substrate.

5. The security element according to claim 1, wherein said magnetic areas are arranged so as to be adjacent one another on said first substrate.

6. The security element according to claim 1, wherein said first substrate is a support made of metallized polyester, text and/or graphic markings being defined by at least partial demetallization of the metallic layer on said first substrate in order to create negative and/or positive texts and/or markings.

7. The security element according to claim 1, wherein said magnetic areas are provided by means of magnetic inks.

8. The security element according to claim 1, wherein said three codes are determinable by all the magnetic areas that are present, by the magnetic areas formed by the first magnetic material, and by the magnetic areas formed by the second magnetic material, respectively, wherein the coercivity value of the first magnetic material is higher than that of the second magnetic material.

9. The security element according to claim 1, wherein said areas formed by the first magnetic material and the second magnetic material superimposed are provided by overprinting.

10. The security element according to claim 1, wherein the second substrate is adapted to be coupled to said first substrate, said second substrate being metallized and demetallized at least partially at areas of the first substrate where the at least partially demetallized text or graphic markings are positioned, so that the text or the graphic markings are visible in transmitted light when said first substrate is coupled to said second substrate, while the magnetic areas are not visible.

11. The security element according to claim 1, wherein said second substrate is provided with areas formed by magnetic material which are adapted to be positioned, when said second substrate is coupled to said first substrate, at the areas formed by magnetic material defined on the first substrate, the areas formed by the magnetic material of said second substrate having a different surface and/or thickness with respect to the areas formed by the magnetic material of said first substrate.

12. The security element according to claim 1, wherein said magnetic areas of said second substrate have different thicknesses but identical surfaces with respect to said magnetic areas of said first substrate.

13. The security element according to claim 1, further comprising magnetic areas formed by the second magnetic material which are overprinted on said magnetic areas formed by the first magnetic material of said first substrate, said magnetic areas formed by the second magnetic material exhibiting, with respect to said magnetic areas formed by the first magnetic material of said first substrate, a different coercivity, identical surfaces, so as to provide areas which are composed of said first magnetic material printed on the substrate and of said second magnetic material printed over the first magnetic material, the sum of the residual magnetism of said areas being identical or very similar to the residual magnetism of the areas which are not overprinted by second magnetic material; the identical or different residual magnetism being reached according to one or more of the following configurations:
- using different thicknesses of said first and second magnetic materials;
- using identical thicknesses of said first and second materials but using inks having a different specific residual magnetism;
- providing a mixture of the inks used to print said magnetic areas formed by the first magnetic material and said magnetic areas formed by the second magnetic material.

14. The security element according to claim 1, further comprising, on at least one of its sides, holographic and/or color-shift and/or changing color and/or mono- or multifluorescent images.

15. The security element according to claim 1, wherein a third magnetic material is provided in at least a part of the magnetic areas being at least partially superimposed on said first magnetic material and/or said second magnetic material.

16. A method for manufacturing a security element, particularly for banknotes, security cards, comprising a first substrate which is at least partially opaque when viewed in transmitted light, and a plurality of magnetic areas being arranged on said substrate, wherein each of said magnetic areas is formed by a first magnetic material, a second magnetic material or an arrangement of the first and the second magnetic materials being at least partially superimposed, the first magnetic material and the second magnetic material exhibiting different coercivity values which are detectable by a sensor, wherein the first and second magnetic materials are magnetically saturated such that one of the first and second magnetic materials is not affected by the other, the method comprising the steps of:
- printing on a substrate a first magnetic material defining first magnetic areas, said first magnetic material having a low coercivity value;
- saturating said first magnetic material;
- printing a second magnetic material, having a high coercivity value, greater than said low coercivity value, both on areas of said substrate wherein said first magnetic material is not present and on areas of said substrate wherein said first magnetic material is present, said second magnetic material being printed with at least partial overlapping with respect to said first magnetic material;
- saturating said first and second magnetic materials, such that one of the first and second magnetic materials is not affected by the other.

17. A security element, particularly for banknotes, security cards, comprising a first substrate which is at least partially opaque when viewed in transmitted light, and a plurality of magnetic areas being arranged on said substrate, wherein each of said magnetic areas is formed by a first magnetic material, a second magnetic material or an arrangement of the first and the second magnetic materials being at least partially superimposed, the first magnetic material and the second magnetic material exhibiting different coercivity values which are detectable by a sensor, wherein the first and second magnetic materials are magnetically saturated such that one of the first and second magnetic materials is not affected by the other,
- wherein said different coercivity values are adapted to generate at least three mutually different codes,
- wherein said three codes are determinable by all the magnetic areas that are present, by the magnetic areas formed by the first magnetic material, and by the magnetic areas formed by the second magnetic material, respectively, wherein the coercivity value of the first magnetic material is higher than that of the second magnetic material.

18. A security element, particularly for banknotes, security cards, comprising a first substrate which is at least partially opaque when viewed in transmitted light, and a plurality of magnetic areas being arranged on said substrate, wherein each of said magnetic areas is formed by a first magnetic material, a second magnetic material or an arrangement of the first and the second magnetic materials being at least partially superimposed, the first magnetic material and the second magnetic material exhibiting different coercivity values which are detectable by a sensor, wherein the first and second magnetic materials are magnetically saturated such that one of the first and second magnetic materials is not affected by the other,
- wherein said areas formed by the first magnetic material and the second magnetic material superimposed are provided by overprinting.

19. A security element, particularly for banknotes, security cards, comprising a first substrate which is at least partially opaque when viewed in transmitted light, and a plurality of magnetic areas being arranged on said substrate, wherein each of said magnetic areas is formed by a first magnetic material, a second magnetic material or an arrangement of the first and the second magnetic materials being at least partially superimposed, the first magnetic material and the second magnetic material exhibiting different coercivity values which are detectable by a sensor, wherein the first and second magnetic materials are magnetically saturated such that one of the first and second magnetic materials is not affected by the other,
- wherein a third magnetic material is provided in at least a part of the magnetic areas being at least partially superimposed on said first magnetic material and/or said second magnetic material.

20. A method for reading a security element according to anyone of claims 1, 17, 18 and 19, the method comprising the steps of:
- orienting said magnetic areas with a first magnet having a high coercive power and detecting said magnetic areas by means of a first reading head of a reading sensor, obtaining a first code;
- by means of a second magnet, having a second coercive power which is lower than the first coercive power but sufficient to turn through 90° the magnetism of said magnetic areas formed by the second magnetic material, detecting by means of a second reading head the magnetic areas formed by the first magnetic material, obtaining a second code;
- detecting a third code generated only by the areas formed by the second magnetic material.

21. The method according to claim 20, wherein said magnets and said heads are arranged at an angle ranging from 40 to 50° with respect to the longitudinal and/or transverse extension of said security element.

22. The method according to claim 20, wherein said magnets and said heads are arranged at an angle of 45° with respect to the longitudinal extension of said security element.

23. A security card, comprising at least one security element according to anyone of claims 1, 17, 18 and 19.

24. The security card according to claim 23, wherein said security element is a security thread.

25. The security card according to claim 23, wherein said security element is a security stripe.

\* \* \* \* \*